(12) United States Patent
Durand et al.

(10) Patent No.: US 7,711,780 B1
(45) Date of Patent: May 4, 2010

(54) METHOD FOR DISTRIBUTED END-TO-END DYNAMIC HORIZONTAL SCALABILITY

(75) Inventors: Alain D. Durand, Beaverton, OR (US); Jason L. Goldschmidt, San Francisco, CA (US); Michael F. Speer, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1687 days.

(21) Appl. No.: 10/895,228

(22) Filed: Jul. 20, 2004

(51) Int. Cl.
*G06F 15/16* (2006.01)
*G06F 15/173* (2006.01)
(52) U.S. Cl. .................. 709/206; 709/225; 709/230
(58) Field of Classification Search .............. 709/206, 709/245, 225, 230
See application file for complete search history.

(56) References Cited

U.S. PATENT DOCUMENTS

| 2003/0135578 | A1* | 7/2003 | Banga et al. | 709/238 |
| 2004/0177382 | A1* | 9/2004 | Choi | 725/135 |
| 2006/0271655 | A1* | 11/2006 | Yoon et al. | 709/223 |

* cited by examiner

*Primary Examiner*—Paul H Kang
(74) *Attorney, Agent, or Firm*—Osha • Liang LLP

(57) ABSTRACT

A datacenter system including a plurality of nodes configured to send and receive a service request, a service table on the plurality of nodes configured to store route information extracted from a signaling mechanism, and a forwarding engine configured to route the service request to at least one of the plurality of nodes using route information from the service table.

18 Claims, 4 Drawing Sheets

METHOD FOR DISTRIBUTED END-TO-END DYNAMIC HORIZONTAL SCALABILITY

BACKGROUND

A datacenter is a facility that physically houses various equipment, such as computers, servers (e.g., web servers, application servers, database servers), switches routers, data storage devices, load balancers, wire cages or closets, vaults, racks, and related equipment for the purpose of storing, managing, processing, and exchanging data and information between nodes. A node is typically either a client or a server within the data center. Datacenters also provide application services and management for various data processing functions, such as web hosting internet, intranet, telecommunication, and information technology.

Datacenters are a unique environment because all the machines and services provided to clients are within a controlled and well-monitored environment. Additionally, datacenters are not static. In other words, datacenters are constantly growing to add more machines, services, and users. Therefore, scaling datacenters to increase performance due to the growth of services and users is an ongoing effort.

Conventionally, when scaling datacenters to achieve more performance, two approaches are used. Vertical scaling involves using larger machines (i.e., computers, servers) by adding more central processing units (CPUs) to one machine or upgrading machines to include faster CPUs. For example, a datacenter administrator, whose machines currently include 32 CPUs, may purchase 32 more CPUs to make a 64 CPU machine. An alternate method for scaling datacenters is known as horizontal scaling. Horizontal scaling involves adding more physical machines to the datacenter. More specifically, horizontal scaling involves adding many smaller machines and working to balance the load on each of these smaller machines within the datacenter. For example, if a datacenter currently holds 50 machines, each with one or two CPUs, then horizontal scaling would involve adding another 50 machines, again with one or two CPUs, to the datacenter.

Typically, in order to address the load balancing aspect of horizontal scaling, load balancing switches are used in the middle tier of the datacenter network. The load balancing switches are capable of making intelligent decisions regarding which servers are best suited to handle requests from clients by inspecting the network traffic. For example, if a client sends a packet to a particular server, a load balancing switch intercepts and inspects the packet, and based on the amount of traffic on the various servers in the datacenter and the packet contents, forwards the packet to an appropriate server. Typically, the load balancing switches are not transparent to the datacenter network and need to be reconfigured each time servers are added to the datacenter.

As noted above, load balancing switches need to be able to inspect network traffic in order to make intelligent decisions regarding where to forward requests. Consequently, encryption is not used for security purposes, and users have to rely on the physical security of the datacenter network. In some instances, load balancing switches may include the functionality to decrypt network traffic, inspect packets, and then re-encrypt the packets before forwarding them to a server. In order to perform the decryption and re-encryption of network traffic, the encryption/decryption keys would also be required by the load-balancing switches.

SUMMARY

In general, in one aspect, the invention relates to a datacenter system comprising a plurality of nodes configured to send and receive a service request, a service table on the plurality of nodes configured to store route information extracted from a signaling mechanism, and a forwarding engine configured to route the service request to at least one of the plurality of nodes using route information from the service table.

In general, in one aspect, the invention relates to a method for selecting a node in a datacenter comprising generating a request, obtaining route information for the request from a service table, obtaining a plurality of nodes based on route information, selecting at least one of the plurality of nodes using a selection policy, and sending the request to the at least one of the plurality of nodes using route information.

In general, in one aspect, the invention relates to a method for generating a service table comprising assigning a virtual internet protocol address to a service, sending an advertisement of the service to a plurality of nodes using a routing protocol, extracting route information from the advertisement, and storing the route information in the service table for each of the plurality of nodes.

In general, in one aspect, the invention relates to a computer system for selecting a node in a datacenter comprising a processor, a memory, a storage device, and software instructions stored in the memory for enabling the computer system under control of the processor, to generate a request, obtain route information for the request from a service table, obtain a plurality of nodes based on route information, select at least one of the plurality of nodes using a selection policy, and send the request to the at least one of the plurality of nodes using route information.

In general, in one aspect, the invention relates to a network system having a plurality of nodes comprising a service table on the plurality of nodes configured to store route information extracted from a signaling mechanism, and a forwarding engine configured to route the service request to at least one of the plurality of nodes using route information from the service table, wherein the plurality of nodes is configured to send and receive a service request, wherein the service table is located on at least any one of the plurality of nodes, and wherein the forwarding engine is located on at least any one of the plurality of nodes.

Other aspects of the invention will be apparent from the following description and the appended claims.

DETAILED DESCRIPTION

Figure 1:
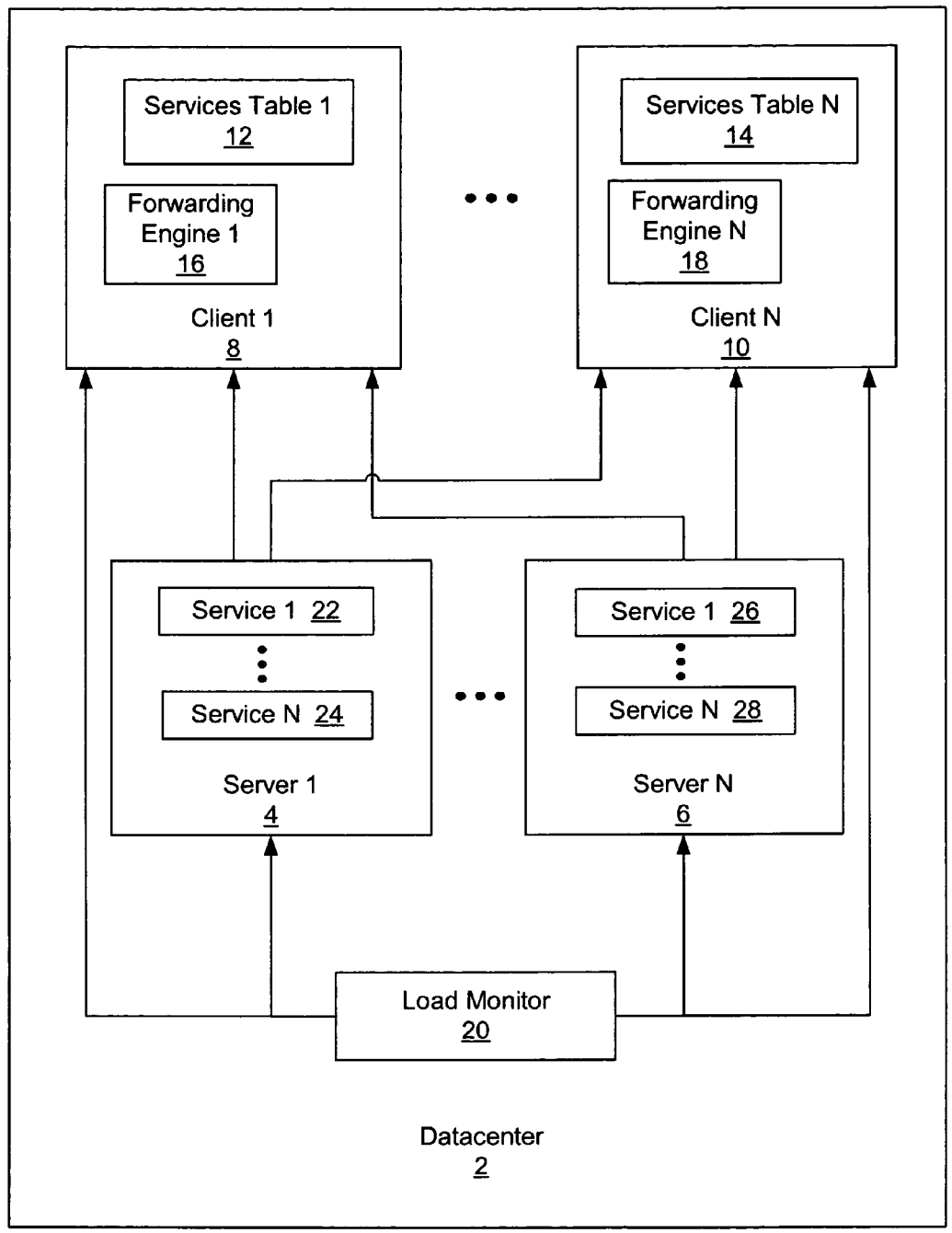
FIG. 1 shows a datacenter in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method for pushing end-to-end horizontal scalability to the edges of a datacenter network. Embodiments of the invention relate to dispatching requests between nodes within the datacenter. In addition, embodiments of the invention relate to providing servers within a datacenter with a signaling mechanism to dynamically advertise services to clients. Further, embodiments of the invention relate to a method for clients to store information regarding which servers offer which services by storing multiple routes for the same service.

FIG. 1 shows a datacenter (2) in accordance with one embodiment of the invention. Typically, a datacenter (2) includes multiple nodes, which may be servers, clients, etc., that are used to exchange information. A datacenter is typically a controlled and well-monitored environment. In one embodiment of the invention, a datacenter (2) may also be a distributed datacenter, where the nodes and other physical equipment within the datacenter may be distributed across multiple physical locations. In FIG. 1, multiple nodes are shown as servers (Server 1 (4), Server N (6)) and clients (Client 1 (8), Client N (10)). In one embodiment of the invention, clients (8, 10) are nodes that initiate requests, and servers (4, 6) are nodes that respond to requests. Specifically, a server (4, 6) includes functionality to offer one or more services (e.g., Service A (22), Service N (24), Service A (26), Service N (28)) in response to a request from other nodes within the datacenter.

For example, a server may be a web server, an LDAP server, NFS server, etc. Further, services corresponding to the aforementioned types of servers may include web services, LDAP services, file system services, etc., respectively. Similarly, clients (8, 10) may include NFS clients that request NFS services, LDAP clients that request LDAP services, etc. One skilled in the art will appreciate that a node may simultaneously be both a server and a client for different roles. For example, a web server providing services to clients may also be a client making an LDAP request.

In one embodiment of the invention, the datacenter uses horizontal scaling to increase performance of the datacenter. That is, larger amounts of small machines (i.e., computers, servers, clients, etc.) are added to the datacenter to provide scalability to users. Adding machines allows more services to be offered within the datacenter; consequently, the datacenter is constantly growing. In one embodiment of the invention, in order to balance the load on the large amount of machines in the datacenter, additional software is added on each node. The additional software enables each node to dynamically broadcast services offered by the node and make decisions regarding which server should service a request (i.e., a service request) that is generated by the node.

Continuing with FIG. 1, in one embodiment of the invention, services (22, 24, 26, 28) offered by servers (4, 6) in the datacenter are sent to each client (8, 10) using a signaling mechanism (not shown). The signaling mechanism (not shown) allows servers (4, 6) to use a routing protocol, such as Open Shortest Path First (OSPF), Intersystem to Intersystem (IS-IS), etc., to advertise the routes of services (22, 24, 26, 28) offered by the servers (4, 6) (described below). In one embodiment of the invention, the information regarding services (22, 24, 26, 28) that is sent in the advertisement is extracted by the clients (8, 10) and stored in a services table (Services Table 1 (12), Services Table N (14)). The services table (e.g., 12, 14) is used to store the routing information of various services (22, 24, 26, 28) offered by all the nodes in the datacenter (2). In one embodiment of the invention, the services table (e.g., 12, 14) includes one or more routes for each service (e.g., 22, 242, 26, 28) offered by different servers (4, 6). For example, if two servers within the datacenter offer the same service, then the client stores two routes for that particular service.

Further, in one embodiment of the invention, the client (8, 10) selects one of the available routes to a server (4, 6) present in the services table (12, 14) to service the request generated by the client (8, 10). In one embodiment of the invention, the client (8, 10) selects a node for this purpose using a load monitor (20). The load monitor is an external module that monitors the load of the available servers (4, 6) in the datacenter (2). In one embodiment of the invention, the load monitor (20) sends small, application specific queries to each of the servers (4, 6) in the datacenter (2) and measures the total execution time and datacenter network transit time each server (4, 6) takes to respond to the queries. For example, if a particular server is an NFS server, then the load monitor may send an NFS specific query to the NFS server and measure the response time. Based on the total response time, the load monitor (20) classifies the servers (4, 6) into two categories: low response time and high response time. Additionally, the load monitor (20) may classify servers (4, 6) in additional categories depending on the response time results obtained. In one embodiment of the invention, a random variation may be added to the time interval between each query in order to accurately measure the total response time of each server (4, 6).

One skilled in the art will appreciate that if a large number of clients exist in the datacenter, then one or more clients may be dedicated as load monitors rather than using an external process, so that fewer resources of the datacenter are consumed. In this case, the small queries sent to the server may be queries that monitor the operating system and the system resources (e.g., CPU utilization, memory, etc.). Further, if one or more clients are dedicated to this purpose, then the client(s) performing load monitoring may share the results obtained on each server's total response time with other nodes in the datacenter. One skilled in the art will appreciate that a client may select a server to service a request based a combination of factors (e.g., a selection policy, as described below) in addition to the results obtained by the load monitor. Alternatively, a client may use a selection policy that is not based on the results obtained by the load monitor to select a server.

As noted above, using the results of the load monitor (20) and the routing information stored in the services table (12, 14), each client (8, 10) selects a server (4, 6) to service a request. In one embodiment of the invention, this request is forwarded to the selected server using a forwarding engine (Forwarding Engine 1 (16), Forwarding Engine N (18)). Specifically, the forwarding engine (16, 18) uses the routing information stored in the service table (12, 14) to provide the request (being sent by the client) a route to the selected server. Additionally, in one embodiment of the invention, the forwarding engine (16, 18) includes functionality to substitute the destination IP address chosen by an application or process running on the client (8, 10) with the second to last node in the routing path to the selected server. The second to last node in the routing path of the selected server is the physical address of the selected server. This information is stored in the services table on the client (8, 10). Initially, when a service request is made by the client (8, 10) (i.e., an application or process running on the client (8, 10), a server (4, 6) has not been chosen to service the request. When a server (4, 6) is chosen based on the services table (12, 14), the physical address of the selected server (4, 6) is substituted for the IP address initially generated by the client (8, 10).

Figure 2:
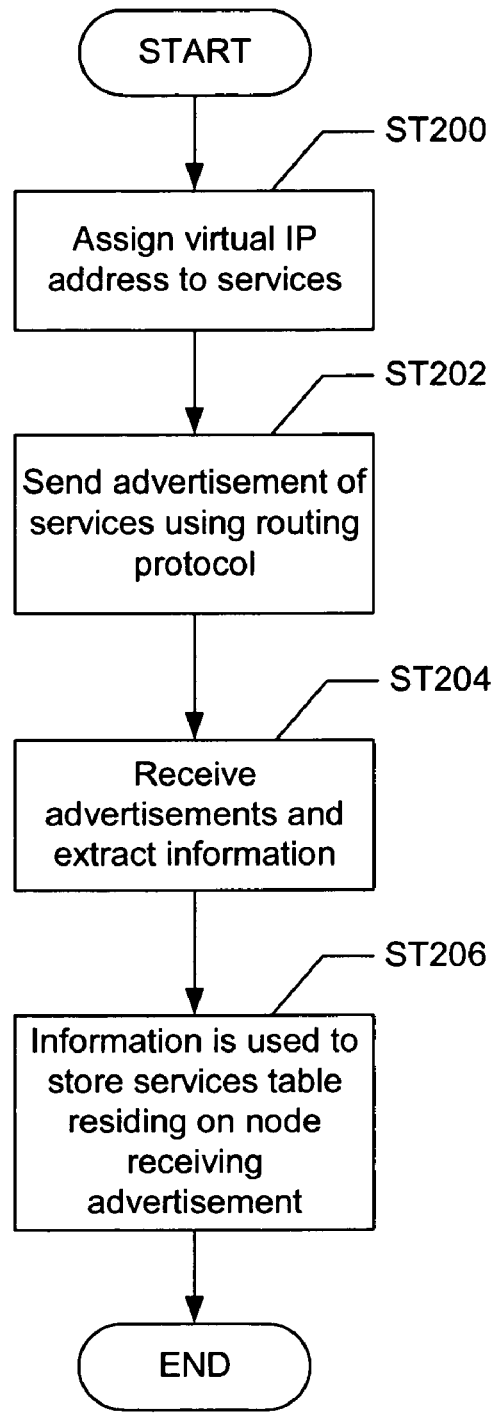
FIG. 2-3 shows a flow chart in accordance with an embodiment of the invention.

FIG. 2 shows a flow chart for generating the services table in accordance with one embodiment of the invention. Initially, a virtual IP address is assigned to all the services provided by nodes within the datacenter (Step 200). This enables all the nodes associated with a particular service to configure the virtual IP address assigned to that service on the nodes's loopback interface. The loopback interface is a virtual physical interface that does not have hardware associated with the interface and is not physically connected to a network. Rather, the loopback interface allows the node to use a single IP address which can be accessed by any other node in the datacenter. For example, if a service is assigned a virtual IP address 10.255.0.133, then all the nodes associated with this service configures 10.255.0.133 on their loopback interfaces. In other words, there may be several "routes" to access one particular service, depending on how many nodes are offering the service.

One skilled in the art will appreciate that in a client/server topology, the loopback interface is typically associated with a server. As noted above, servers typically include one or more services. As a result, one skilled in the art will appreciate that services sent using the routing protocol are typically associated with a server. Additionally, one skilled in the art will appreciate that while the example above used IPV4 addresses (i.e., 10.255.0.133), IPV6 addresses may also be used to assign virtual IP addresses to services.

Subsequently, each node sends an advertisement of the services the node is capable of offering (Step 202). In one embodiment of the invention, the advertisement is sent to nodes within the datacenter using a fast converging routing protocol, such as OSPF, etc. A fast converging routing protocol allows other nodes within the datacenter to be immediately notified if a node fails or is no longer active. Specifically, the routing protocol allows each node to advertise services via routes to a prefix representing the virtual IP address assigned to the service. For example, the prefix representing the service with a virtual IP address of 10.255.0.133 would be 10.255.0.133/32. Further, if there are 10 servers offering this service, then the advertisement sends 10 different, equal cost routes to this prefix. In one embodiment of the invention, the 10 routes presented to the node differ only in the second to last IP address in the path. This is because the second to last address is the physical address each node offering the service. One skilled in the art will appreciate that any fast converging routing protocol may be used to send an advertisement of services within the datacenter. At this stage, all the nodes in the datacenter receive the advertisements from other nodes and extract the route information provided in the advertisements (Step 204). The route information is subsequently stored in the services table residing on each node that received the advertisement (Step 206). One skilled in the art will appreciate that in a client/server topology, the server sends advertisements using a routing protocol to clients, and upon receiving the advertisements, clients extract and store route information into a services table.

Figure 3:
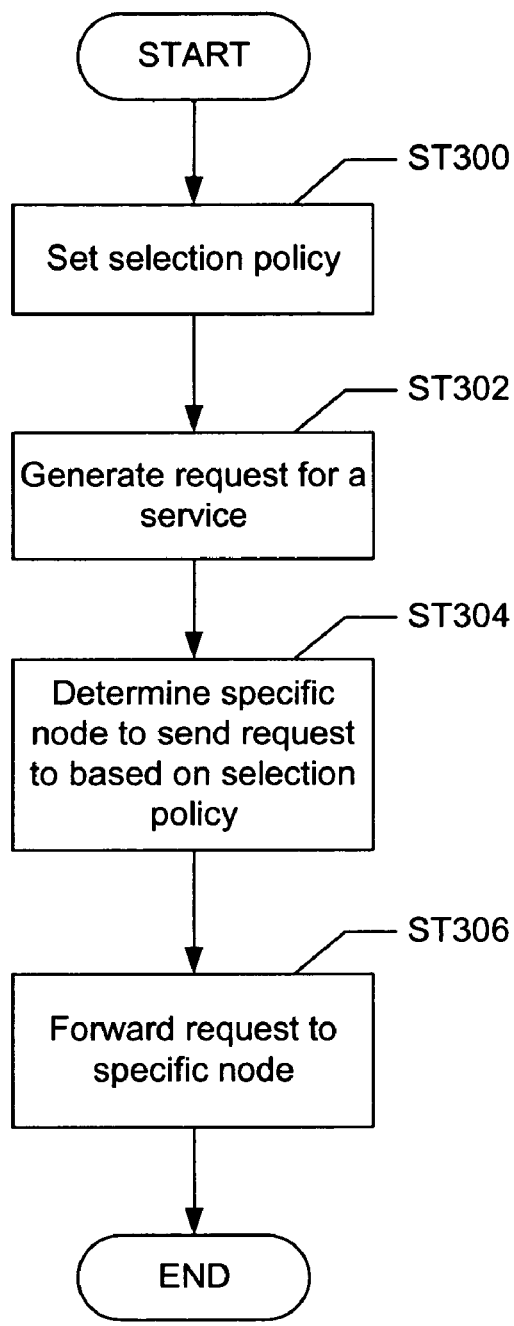

FIG. 3 shows a flow chart for making load balancing decisions in accordance with one embodiment of the invention. While the following discussion describes load balancing with respect to a client/server topology, one skilled in the art will appreciate that load balancing as described below, may be performed in other topologies. Initially, a client sets a selection policy that may be used to select a node to service a particular request (Step 300). For example, if several servers offer the same service, then the client may use a selection policy to choose a server. Typical selection policies may include, round robin, weighted round robin, least connected, random, load-based, etc. For example, the least connected selection policy chooses a server that has least recently been used to service a request. Alternatively, the load-based selection policy selects a server which the load monitor classified as low response time.

Subsequently, a request for a service is generated by the client (Step 302). In one embodiment of the invention, the request may be generated by a process or application running on the client. At this stage, the client determines a specific node to service the request based on the selection policy (Step 304). As described above, the client uses the services table to determine subset of servers that offer the service requested by the client, and then uses the selection policy to select a server from the subset. Once a specific server is selected, the request is forwarded to the selected node using the forwarding engine (Step 306). As noted above, the forwarding engine substitutes the destination IP address supplied by the process/application generating the request with the IP address of the second to last node in the routing path determined by the routing protocol. In one embodiment of the invention, the selected node is cached in the client for the duration of the connection with the server. Therefore, multiple requests may be forwarded to the selected node during the connection.

Figure 4:
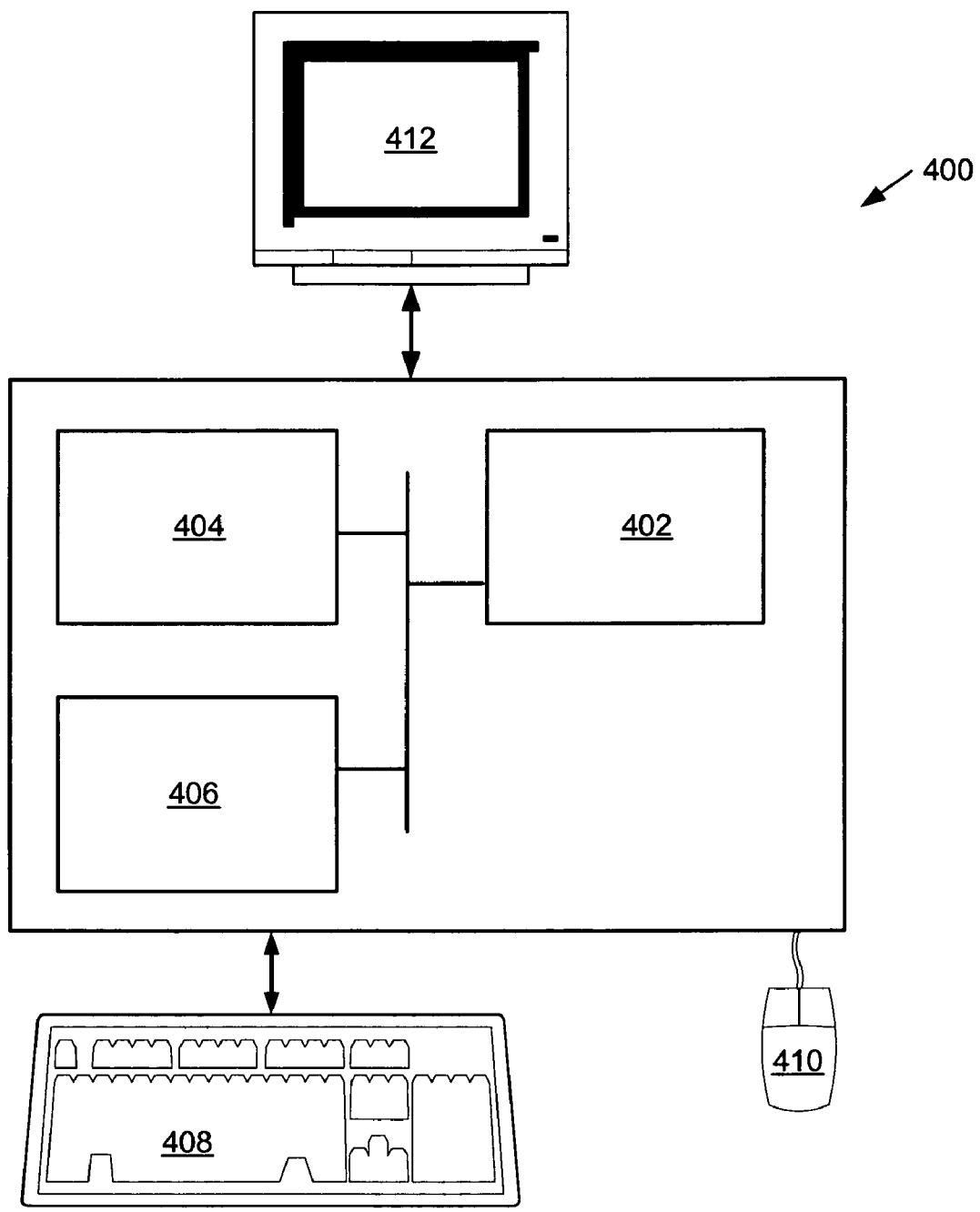
FIG. 4 shows a computer system in accordance with an embodiment of the invention.

An embodiment of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

Further, embodiments of the invention may be implemented on a distributed system having a plurality of nodes, where each portion of the invention (e.g., service table, servers, clients, forwarding engine, etc.) may be located on a different node within the distributed system. In one embodiment of the invention, the node corresponds to a computer system. Alternatively, the node may correspond to a processor with associated physical memory.

Embodiments of the invention provide a method to make load balancing decisions at the edges of a datacenter network. In other words, clients can use datacenter resources (such as a load monitor and a services table) to make intelligent decisions regarding which servers are best suited to service particular requests. Further, because load balancing decisions are made end-to-end within the datacenter, any form of security (e.g., encryption) may be used to protect network traffic within the datacenter. Further, embodiments of the invention offer a dynamic way to broadcast services offered by nodes within the datacenter. In other words, all the available nodes acting as servers are automatically detected by the network and the services offered by these server are broadcast each time a new server is added to the datacenter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a plurality of clients configured to request a service;
   one of a plurality of services tables on each of the plurality of clients configured to store first route information extracted from a signaling mechanism, wherein the first route information is extracted from a first advertisement of the service from at least one of a plurality of servers; and
   a forwarding engine configured to route a first request for the service to the at least one of the plurality of servers using the first route information from the services table,
   wherein at least one of the plurality of clients is configured to dynamically update the corresponding one of the plurality of services tables with second route information extracted from a second advertisement from a new server.

2. The system of claim 1 further comprising:
   a load monitor configured to classify the plurality of servers based on a query response time.

3. The system of claim 2, wherein the query response time is one selected from the group consisting of a low response time and a high response time.

4. The system of claim 1, wherein the signaling mechanism comprises a routing protocol configured to advertise route information to the plurality of nodes.

5. The system of claim 1, wherein each of the plurality of servers comprises a plurality of services.

6. The system of claim 5, wherein each of the plurality of services is assigned a virtual internet protocol address.

7. The system of claim 1, wherein the first request is generated on one of the plurality of clients.

8. The system of claim 1, where the forwarding engine is stored on at least one of the plurality of clients.

9. The system of claim 1, wherein each of the first route information and the second route information comprises at least one route to a prefix representing the service.

10. A method for selecting a node comprising:
    generating a first request for a service;
    selecting the node from a plurality of nodes from a services table using a selection policy, wherein the services table comprises first route information for the node;
    sending the first request to the node using the first route information;
    receiving an advertisement of the service from a new node, wherein the new node uses a routing protocol to send the advertisement;
    extracting second route information for the new node from the advertisement, wherein the second route information is stored in the services table; and
    generating a second request for the service;
    selecting the new node from the services table using the selection policy; and
    sending the second request to the new node using the second route information.

11. The method of claim 10, wherein the service is assigned a virtual internet protocol address.

12. The method of claim 10 wherein the selection policy is one selected from the group consisting of round robin, weighted round robin, least connected, random, and load-based.

13. The method of claim 11, wherein the routing protocol is a fast converging routing protocol.

14. The method of claim 11, wherein each of the first route information and the second route information comprises at least one route to a prefix representing the service.

15. The method of claim 10, wherein each of the plurality of nodes comprises a plurality of services.

16. The method of claim 10, wherein the services table resides on a client requesting the service.

17. A computer system for selecting a node comprising:
    a processor;
    a memory;
    a storage device; and
    software instructions stored in the memory for enabling the computer system under control of the processor, to:
      generate a first request for a service;
      select the node from a plurality of nodes from a services table using a selection policy, wherein the services table comprises first route information for the node;
      send the first request to the node using the first route information;
      receive an advertisement of the service from a new node, wherein the new node uses a routing protocol to send the advertisement;
      extract second route information for the new node from the advertisement, wherein the second route information is stored in the services table; and
      generate a second request for the service;
      select the new node from the services table using the selection policy; and
      send the second request to the new node using the second route information.

18. The computer system of claim 17, wherein the service is assigned a virtual internet protocol address.

* * * * *